F. RICHARD.
BRAKE EQUALIZER.
APPLICATION FILED APR. 12, 1917.
1,289,266.
Patented Dec. 31, 1918.
3 SHEETS—SHEET 2.
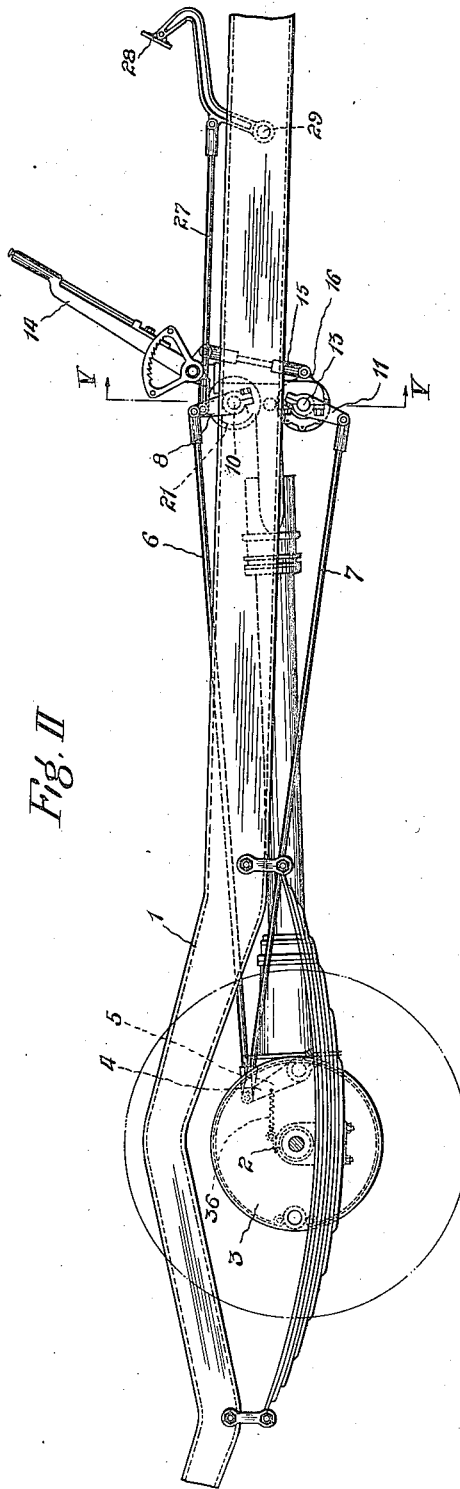
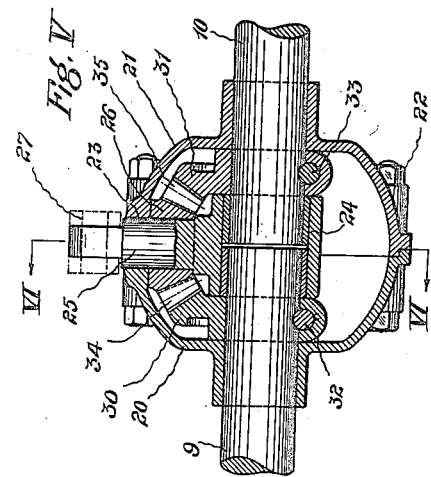
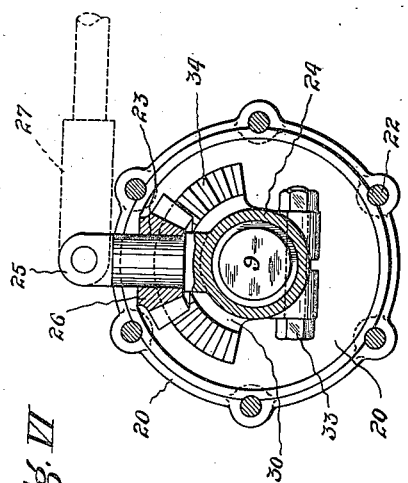
Inventor
François Richard
by his atty.

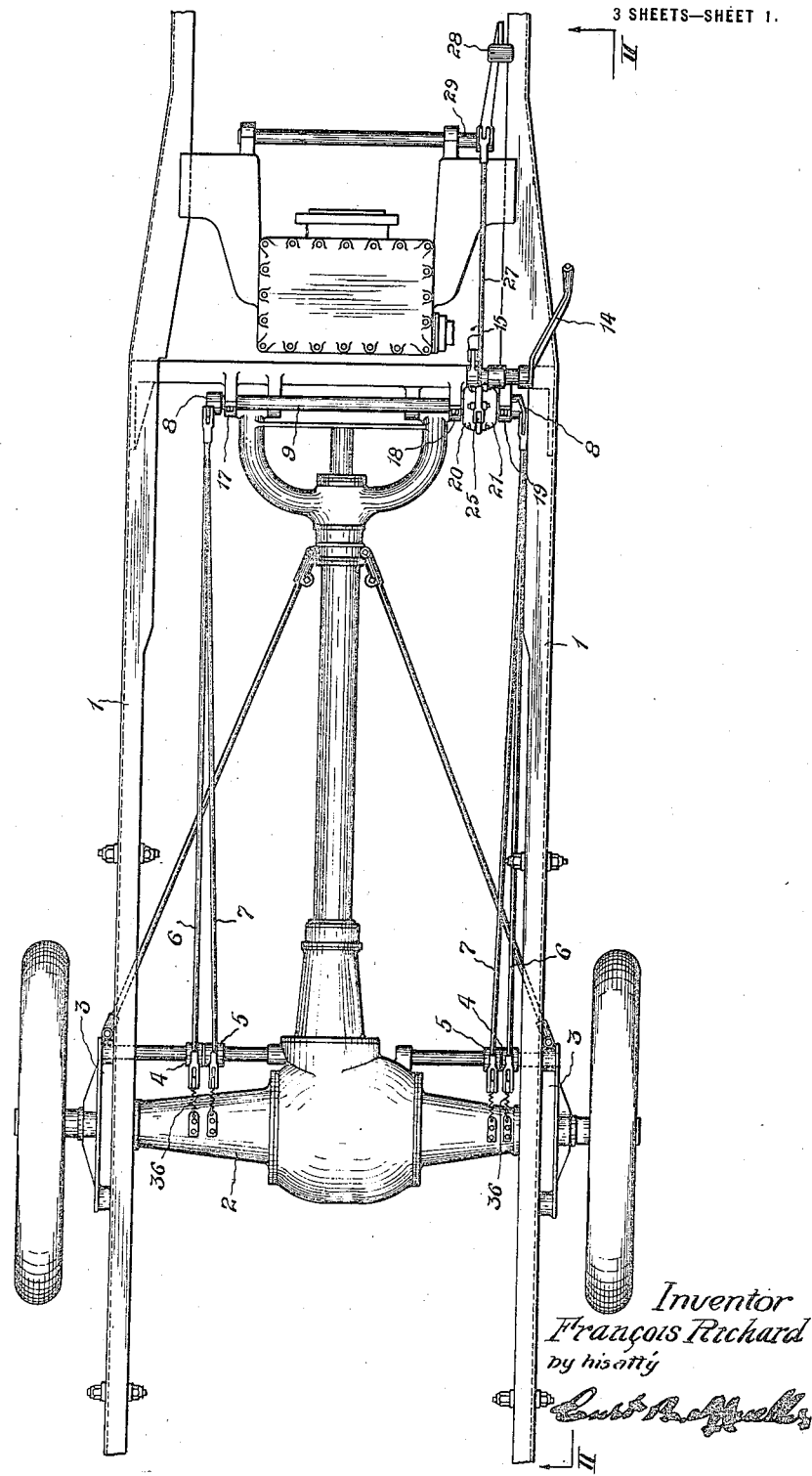

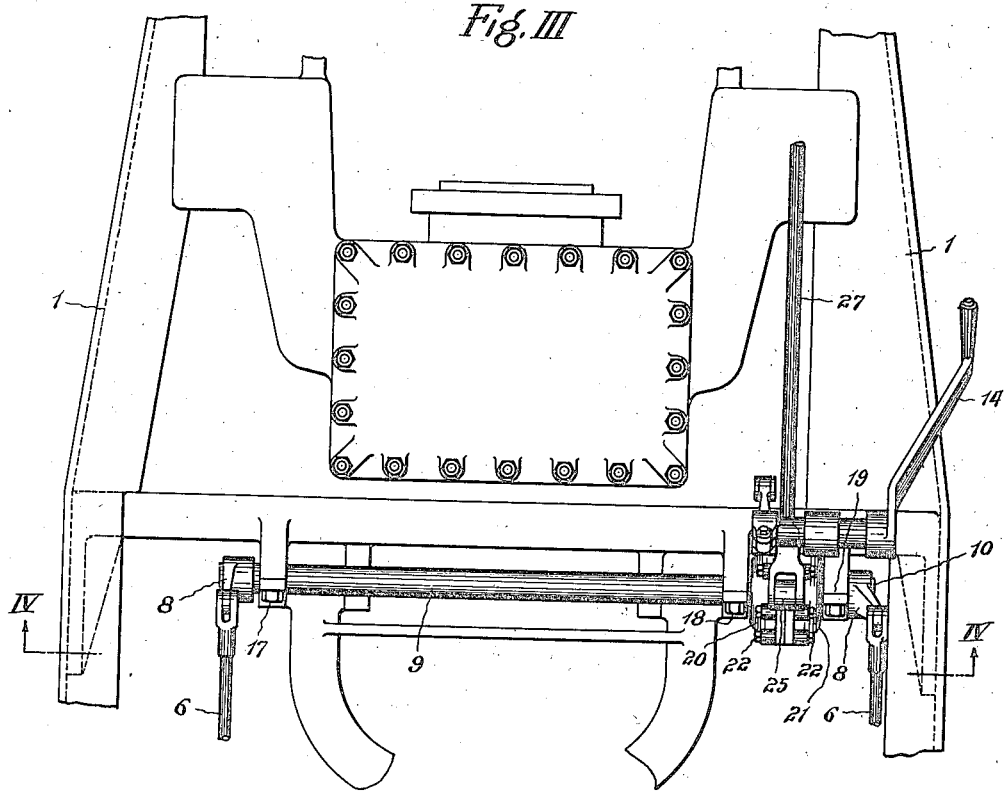
Fig. III
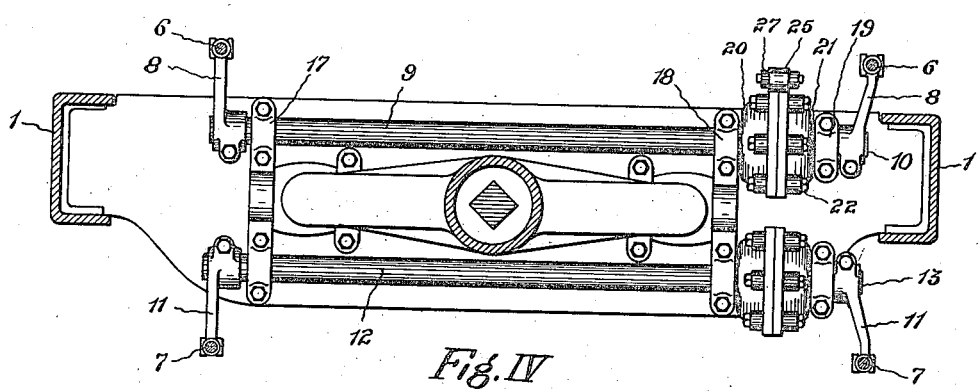
Fig. IV
Inventor
François Richard
by his atty.

UNITED STATES PATENT OFFICE.

FRANÇOIS RICHARD, OF CLEVELAND, OHIO, ASSIGNOR TO THE RICHARD AUTO MFG. COMPANY, OF CLEVELAND, OHIO.

BRAKE-EQUALIZER.

1,289,266.

Specification of Letters Patent.   Patented Dec. 31, 1918.

Application filed April 12, 1917.   Serial No. 161,530.

*To all whom it may concern:*

Be it known that I, FRANÇOIS RICHARD, a citizen of the French Republic, residing at 7800 Finney Ave., city of Cleveland, in the county of Cuyahoga and State of Ohio, have invented a new and useful Improvement in Brake-Equalizers, of which the following is a specification, the principle of the invention being herein explained and the best mode in which I have contemplated applying that principle, so as to distinguish it from other inventions.

My invention pertains to a brake equalizer adapted for controlling the appliance of the braking effect upon the hind wheels of an automobile.

The object held in view is to contrive automatically operating mechanism which, in response to foot pedal or hand lever actuation, will equalize the pressure applied to the brake drum associated with each of the rear wheels; thereby increasing not only the efficacy but the life of the structure and at the same time, by making the action more uniform, easing the riding qualities of the superstructure of the car whenever it becomes necessary to apply the brakes.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

Adverting to the drawings:

Figure I is a top plan view of an automobile chassis embodying my invention.

Fig. II is a side elevation of Fig. I.

Fig. III is an enlarged plan of a forward portion of Fig. I.

Fig. IV is a vertical section on line IV—IV of Fig. III looking forwardly.

Fig. V is a still further enlarged section on line V—V of Fig. II.

Fig. VI is a relatively transverse section taken on median line VI—VI of Fig. V.

In Figs. I and II, I have shown the major portion of an automobile frame 1 supported in part from a rear axle housing 2 which in turn carries near each end the conventional type of brake drum 3. Inasmuch as nothing new is claimed for the brake as such nor the character of its friction surfaces, no further description thereof will be made other than to mention the assumption that an interior and exterior frictional engagement is to be accomplished, in the one case by a hand lever and in the other by means of a foot pedal. It should be remembered that such invention is associated merely with the control mechanism by means of which the braking effect is accomplished so that its severity of action may be more nearly uniform in its exercise upon each of the drums 3 consonantly, no detailed description will be given other than to state that one pair of actuating levers 4 are adapted to be moved by a foot pedal and another pair of levers 5 are adapted to be moved upon manipulation of another lever accessible to the driver. As is common in the art the levers 4 articulate with a pair of forwardly extending rods 6, whereas the levers 5, similarly articulate with another pair of forwardly extending rods 7. As may be seen by inspection of Fig. II the rods 6 slope upwardly in a forward direction whereas the rods 7 slope slightly downward in a forward direction. The rods 6 articulate at their forward extremities with arms 8 fixed to the remote ends of a pair of axially alined shafts 9 and 10. Each of the rods 7 articulates at its front end with an arm 11, likewise fixed at remote ends of a pair of axially alined shafts 12 and 13. The shafts 9 and 12 are longer than the shafts 10 and 13, which is necessitated by reason of the fact that they extend across the frame to nearly abut the inner ends of the shafts 10 and 13 near one side of the frame. Inasmuch as the structure which features the present invention is identical for both the ordinary foot brake and the emergency hand operated brake, only the former will be described in detail, according to the disclosure of Figs. II and III and more especially Figs. V and VI. Let it suffice therefore merely to add that the hand lever 14 is operatively connected by means of an adjustable link 15 with a part 16 which is shown in Fig. II and which is to be considered as operatively connected after the manner of my invention so as to effect the partial rotation of the shafts 12 and 13.

The shaft 9 is supported in bearings 17 and 18. The shaft 10 is supported adjacent the near arm 8 by a bearing 19. Inclosing the adjacent ends of the shafts 9 and 10 is a housing composed of complementary parts 20 and 21 held together by a series of circumferentially arranged bolts 22 and designed to form in conjunction with each other, at their tops, an opening 23. Interiorly of the housing is a common sleeve 24 adapted to support the nearly abutting ends of the shafts 9 and 10. Such sleeve is provided with an upwardly projecting journal 25 which extends through the opening 23 and carries interiorly an idler gear 26. The exterior end of the journal articulates with a forwardly extending rod 27 which in turn articulates with a foot pedal 28 having a fixed pivot at 29. A pair of members 30 and 31 are positioned interiorly of the housing so as to abut against opposite sides of the sleeve 24 and are clamped to the shafts 9 and 10 respectvely by means of key bolts 32 and 33 respectively. Each of the members 30 and 31 is fashioned with a gear segment 34 and 35 respectively, each adapted to mesh with the idler 26 whereby any movement communicated to the latter will contrive to equalize the partial rotation or rocking of the shafts 9 and 10 in a given direction. Springs 36 connect each of the levers 4 with the rear axle housing and normally tend to draw the same in a rearward direction and consequently also the rods 6 and the rod 27. As will be readily understood by those skilled in the art a depression of the foot pedal 28 will overcome the action of the springs 36, and in so doing move the rod 27 in a forward direction. In consequence the journal 25 and hence the housing will have rotatory motion imparted to them, the idler 26 in the meantime transmitting such movement to the gear segments after the manner of a differential action.

I claim:—

1. A brake equalizer comprising the combination with a vehicle having a pair of wheels, brakes for controlling the rotation of each wheel, a housing composed of complementary parts having alined bearings and forming in conjunction with each other an opening perpendicular to the axes of said bearings, a pair of axially alined shafts operatively connected with said brakes respectively, said shafts being mounted in said bearings and projecting into said housing, a journal mounted in said perpendicular opening and projecting into said housing, a pinion mounted on said journal interiorly of said housing so as to be revoluble about the axes of said shafts, a pair of toothed members fixed to said shafts respectively and in mesh with said pinion, and means for revolving said housing.

2. A brake equalizer comprising the combination with a vehicle having a pair of wheels, brakes for controlling the rotation of each wheel, a housing, a pair of axially alined shafts operatively connected with said brakes respectively and terminating with said housing, a common bearing sleeve within said housing for near ends of said shafts, said sleeve being provided with a journal mounted in said housing, a pair of gear segments fixed to said shafts within said housing and on opposite sides of said sleeve respectively, an idler rotatably mounted on said journal within said housing, and means for moving said journal bodily about the axes of said shafts.

Signed by me, this 9th day of April, 1917.

FRANÇOIS RICHARD.